Inventors.
KARL BOHM AND
FRITZ ZEUNERT

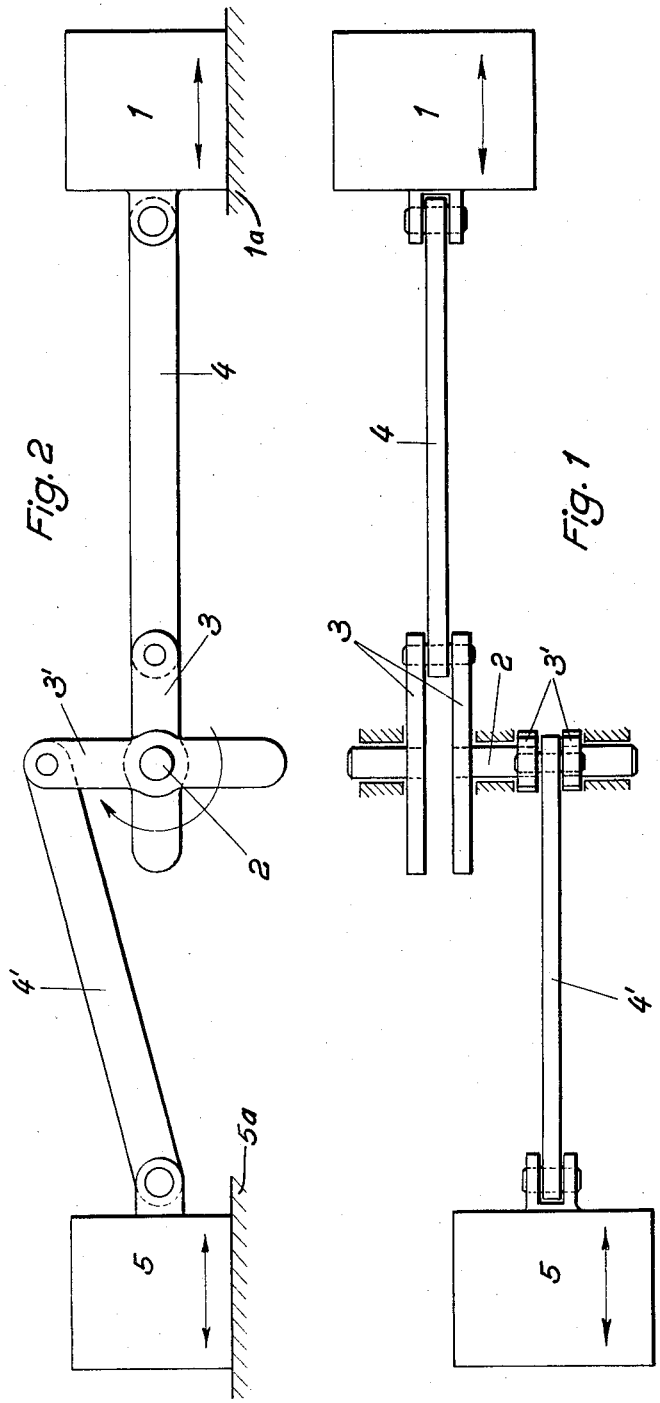

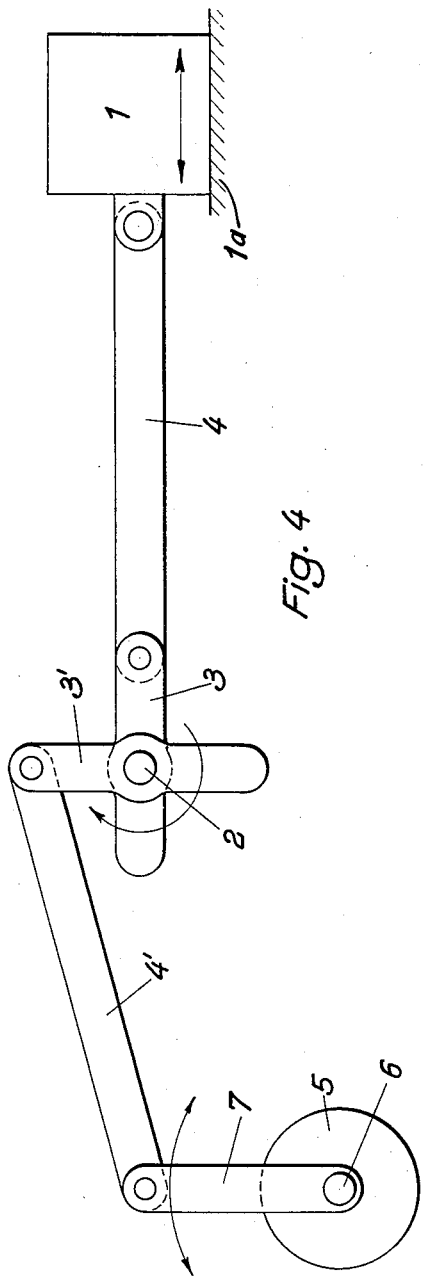
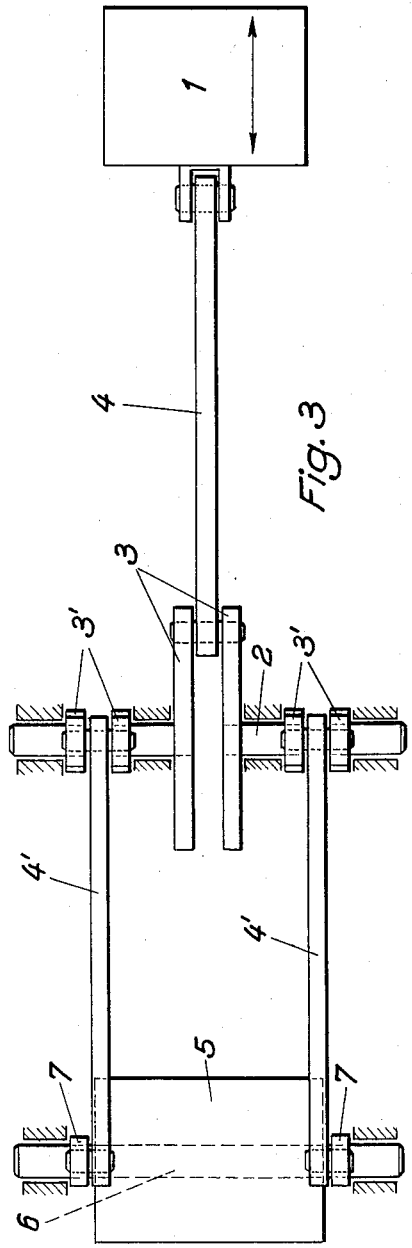

United States Patent Office 2,924,106
Patented Feb. 9, 1960

2,924,106

COMPENSATING MOTION TRANSMITTING ARRANGEMENT FOR ROLL HOUSING MEANS

Karl Bohm and Fritz Zeunert, Munchen-Gladbach, Germany, assignors to Mannesmann-Meer Aktiengesellschaft, Munchen-Gladbach, Germany Application October 22, 1952, Serial No. 316,294

Claims priority, application Germany December 29, 1951

12 Claims. (Cl. 74—44)

This invention relates to rolling mills with a reciprocating roll housing, more especially cold step-by-step rolling mills.

In rolling mills having a reciprocating roll housing, more especially in cold step-by-step rolling mills, it is known to move the roll housing backwards and forwards by thrust transmitted through a rotary coupling drive, usually in the form of a rotatable crank on a crank shaft, the rotary coupling drive imparting to the housing a reciprocatory motion the speed of which is accelerated from zero speed at one dead centre position of the drive up to a maximum speed and then decelerated to zero speed again at the opposite dead centre position of the drive.

More especially in the case of large and correspondingly heavy mills, the acceleration and deceleration forces in the movement of the housing amount to a multiple of the actual rolling effort expended in the machine and in consequence the parts of the transmission gearing, such for example as the connecting gears, belt drives and the like between the driving motor and the rotary coupling drive, are subjected to high stresses. In addition, the acceleration and deceleration forces referred to tend to cause irregular running of the mill, which frequently cannot be kept within permissible limits, even when using a large fly wheel.

It has been proposed to compensate for the acceleration and deceleration forces of the reciprocating roll housing by equal but opposite forces, either by springs or by compressed air cylinders arranged in front of and behind the roll housing. The use of springs for this purpose has proved to be impracticable, since the springs require to be of such large dimensions that it is impossible to fit them in the limited space available. The arrangement of compressed air cylinders in front of and behind the roll housing can be carried into practice, but does not result in complete compensation, since the resultant air pressures follow the law of polytropic compression and expansion respectively, that is to say they vary with reciprocation of the housing at a rate which is different from that of the acceleration and deceleration forces.

A further disadvantage of the use of compressed air cylinders is that they tend to become very strongly heated and the heat thereby produced represents a power loss in the running of the mill.

A further disadvantage still of this arrangement is that the air pressures have to be regulated in accordance with the different numbers of strokes, since different numbers of strokes of the housing also correspond to different forces of acceleration and deceleration.

The above mentioned disadvantages of the prior proposals are obviated by the improved arrangement which is provided by the present invention, according to which a rolling mill with a reciprocating roll housing, more especially a cold step-by-step rolling mill, is characterised in that in addition to the rotary coupling drive of the roll housing there are provided one or more further rotary coupling drives in operative driving connection respectively with one or more movable masses effective by their movement to compensate for the accelerating and decelerating forces of the roll housing, the further coupling drive or drives being in torque transmitting connection with the coupling drive of the roll housing so as to be rotatable as one therewith in the backward and forward movements of the housing and the compensating mass or masses having a reciprocatory (i.e. along a rectilinear path) or a turning (along an arcuate path) movement under drive from the further coupling drive or drives, out of phase with the housing by reason of the fact that the further coupling drive or drives lead or lag, or lead and lag, preferably by 90°, with respect to the coupling drive of the roll housing.

In this connection, it is to be understood that the term "oscillatory" as used in the claims is intended to include either a reciprocating movement, i. e., a straight line to and fro movement, or a turning movement back and forth about an arcuate path.

The size of the compensating mass or masses depends upon the radius or radii of the associated coupling drive or drives. If this radius or these radii is or are selected to be greater than the radius of the coupling drive of the roll housing, the weight or combined weight of the compensating mass or masses will be smaller than the weight of the roll housing.

If desired, the compensating mass may be constituted by a second roll housing driven out of phase with the first roll housing.

The invention will now be further described with reference to the accompanying drawings.

In these drawings:

Figure 1 is a plan view and Figure 2 a corresponding side elevation showing an arrangement in which the acceleration and deceleration forces are compensated for by a reciprocating mass;

Figure 3 is a plan view and Figure 4 a corresponding elevation of an arrangement in which the acceleration and deceleration forces are compensated for by an oscillating mass.

Figure 7:
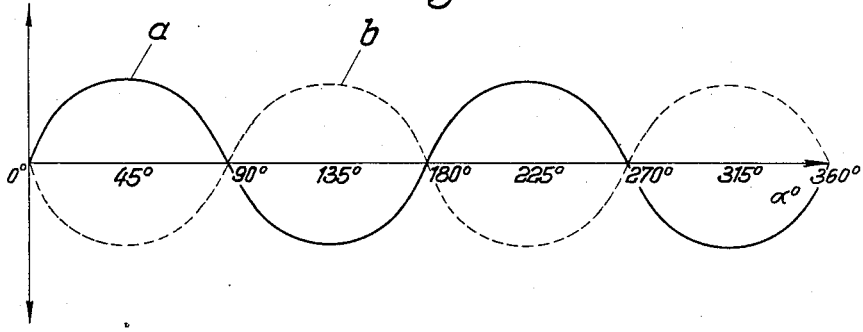
Figures 5, 6 and 7 show by means of graphs the conditions obtaining as regards acceleration, speed and acceleration forces in an arrangement as shown in Figures 1 and 2.

Referring first to Figures 1 and 2, the reciprocating roll housing is shown more or less diagrammatically and is marked 1. The rotary coupling drive of the housing 1 is constituted by a rotatable crank shaft 2 fast with a crank 3. Also fast with the shaft 2 is a second crank 3'. The crank 3' is out of phase by 90° with respect to the crank 3. The crank 3 is connected to the housing 1 by a driving rod 4. The crank 3' is similarly connected to a compensating mass 5 by a driving rod 4', the compensating mass 5 having a reciprocating motion similarly to the housing 1. Supporting means 1a slidably support the main driven means 1 for straight reciprocating horizontal movement and supporting means 5a slidably support the driven compensating means 5 for straight reciprocating horizontal movement.

The arrangement illustrated in Figures 3 and 4 differs from that illustrated in Figures 1 and 2 in that there are two cranks 3' and similarly two driving rods 4', the compensating mass 5 having an oscillating movement in contrast to a reciprocating movement, about the axis of a shaft 6, with which are fast a pair of cranks 7 to the outer ends of which the driving rods 4' are pivotally connected. The compensating mass 5 is keyed to the shaft 6 and the arrangement is such that as the cranks 3, 3' perform their rotary motion the compensating mass 5 performs an oscillating motion about the axis of the shaft 6 90° out of phase with the reciprocatory motion of the roll housing 1. Supporting means 1a slidably supports the main driven means for straight horizontal movement. Shaft 6 constitutes a supporting means for the compensating means 5. The supporting means 1a, 5a and 6 eliminate in both embodiments the influence of the weights of means 1 and 5 on the compensation of torques, transmitted by crank shaft 2.

Figure 5:
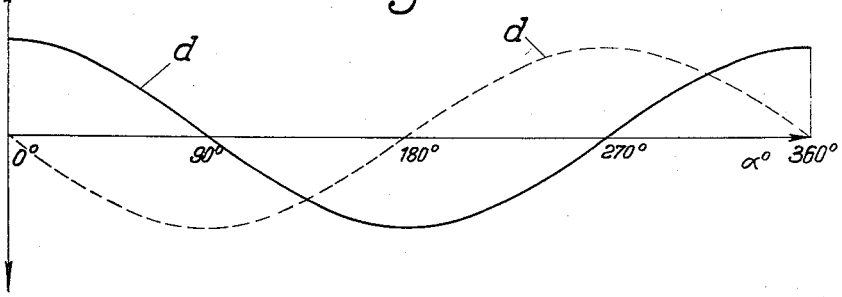

In Figure 5, the crank angles are plotted as abscissae and the acceleration or deceleration as ordinates. The full-line curve $d$ represents the acceleration or deceleration of the roll housing and the dotted line curve $d'$ the acceleration or deceleration of the compensating mass.

Figure 6:
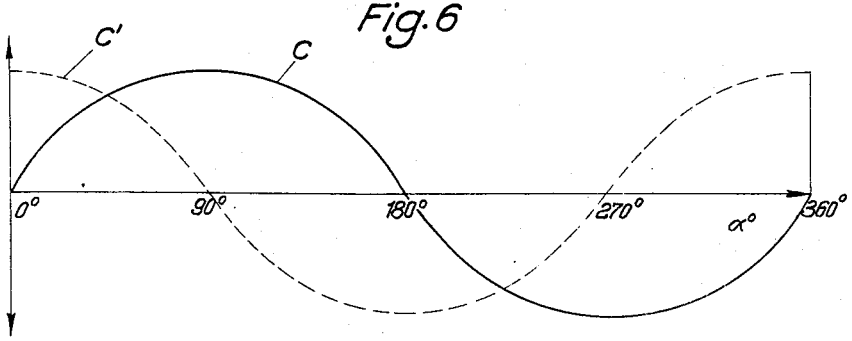

In Figure 6, the crank angles are plotted as abscissae and the speed as ordinates. The full-line curve $c$ represents the speed of the roll housing and the dotted line curve $c'$ the speed of the compensating mass.

In Figure 7, the crank angles are plotted as abscissae and the acceleration or deceleration forces as ordinates. The full-line curve $a$ represents the accelerating or decelerating torque for the roll housing and the curve $b$ the acceleration or deceleration torque for the compensating mass.

The curves $a$ and $b$ have twice the frequency of the curves $c$, $c'$, $d$ and $d'$. The curve $b$ is displaced by 90° with respect to the curve $a$, that is to say, with equal amplitudes of these two curves, the values at any desired crank angle are equal to one another, but have the opposite sign. The sum of the two curves is therefore zero, that is to say, the sum of the forces of acceleration or deceleration of the roll housing and compensating mass is at any instant equal to zero.

It is to be mentioned that with single rolling mills, an exact compensation of the mass acceleration force is theoretically only possible with infinitely long driving rods—in practice, with an "oscillating cross loop." However, with driving rods of finite length, the accelerating forces which are not capable of being balanced can be reduced, by the fact that, in relation to the roll housing, one part of the compensating mass, for example one half thereof, is given a lead, preferably by 90°, while the other part lags with respect to the roll housing, preferably by 90°.

It is also to be mentioned that the excess forces of acceleration which are not balanced can be used as rolling forces and thus a smaller loading of the parts of the transmission gearing and a greater uniformity of the motor power diagram can be attained.

In the arrangements illustrated in Figures 1 and 2 and Figures 3 and 4 separate compensating masses 5 are employed for balancing the forces of acceleration and deceleration of the roll housing. As already indicated, however, it is possible instead of using a separate compensating mass in accordance with these arrangements, to use a second roll housing as compensating mass, the arrangement in this event being one in which the two roll housings are driven from one and the same crank shaft, or alternatively one in which two normal rolling mills are coupled together. In either case the two roll housings would move out of phase with respect to one another, preferably by 90° of rotation of the coupling drive of the housings.

What we claim as our invention and desire to secure by letters patent of the United States is:

1. A motion transmitting arrangement, comprising in combination, main driven means having a mass; supporting means supporting said main driven means to reciprocate along a predetermined path and counteracting the force of gravity acting on said mass; rotatable driving means; first coupling means connected at one end to said rotatable driving means for rotation therewith at said one end and connected at its other end to said main driven means so as to impart a reciprocatory movement to said main driven means during rotation of said rotatable driving means; driven compensating means having a mass; supporting means supporting said compensating means to oscillate along a predetermined path and counteracting the force of gravity acting on said mass of said compensation means; and second coupling means connecting said driven compensating means to said rotatable driving means and attached at one end to said rotatable driving means in such manner as to impart an oscillatory movement to said driven compensation means having a cycle substantially equal to that of the reciprocatory movement of said main driven means and which is out of phase with said reciprocatory movement of said main driven means, whereby the acceleration and deceleration torques of said driven compensating means compensate, respectively, the acceleration and deceleration torques of said main driven means during the reciprocatory movement of the latter means.

2. A motion transmitting arrangement, comprising in combination, main driven means having a mass adapted to reciprocate along a predetermined path; rotatable driving means; first coupling means connected at one end to said rotatable driving means for rotation therewith at said one end and connected at its other end to said main driven means so as to impart to said main driven means during rotation of said rotatable driving means a reciprocatory movement having an acceleration and deceleration varying according to a sinusoidal function; driven compensating means having a mass adapted to oscillate along a predetermined path; and second coupling means connecting said driven compensating means to said rotatable driving means and attached at one end to said rotatable driving means in such manner as to impart an oscillatory movement to said driven compensating means having a cycle substantially equal to that of the reciprocatory movement of said main driven means, having an acceleration and deceleration varying according to a sinusoidal function and which is out of phase with said reciprocatory movement of said main driven means, whereby the acceleration and deceleration torques of said driven compensating means compensate, respectively the acceleration and deceleration torques of said main driven means during the reciprocatory movement of the latter means.

3. A motion transmitting arrangement, comprising in combination, main driven means having a mass adapted to reciprocate along a predetermined path; rotatable driving means; first coupling means connected at one end to said rotatable driving means for rotation therewith at said one end and connected at its other end to said main driven means so as to impart to said main driven means during rotation of said rotatable driving means a reciprocatory movement producing acceleration and deceleration forces varying according to a sinusoidal function; driven compensating means having a mass adapted to oscillate along a predetermined path; and second coupling means connecting said driven compensating means to said rotatable driving means and attached at one end to said rotatable driving means in such manner as to impart an oscillatory movement to said driven compensating means having a cycle substantially equal to that of the reciprocatory movement of said main driven means, producing acceleration and deceleration forces varying according to a sinusoidal function and which is out of phase with said reciprocatory movement of said main driven means, whereby the acceleration and deceleration torques of said driven compensating means compensate, respectively, the acceleration and deceleration torques of said main driven means during the reciprocatory movement of the latter means.

4. A motion transmitting arrangement, comprising in combination, main driven means having a mass adapted to reciprocate along a predetermined path; rotatable driving means; first coupling means connected at one end to said rotatable driving means for rotation therewith at said one end and connected at its other end to said main driven means so as to impart to said main driven means during rotation of said rotatable driving means a reciprocatory movement producing acceleration and deceleration forces varying according to a sinusoidal function; driven compensating means having a mass adapted to oscillate along a predetermined path; and second coupling means connecting said driven compensating means to said rotatable driving means and attached at one end to said rotatable driving means in such manner as to impart an oscillatory movement to said driven compensating means having a cycle substantially equal to that of the reciprocatory movement of said main driven means, producing acceleration and deceleration forces varying according to a sinusoidal function and which is 90° out of phase with said reciprocatory movement of said main driven means so as to produce acceleration and deceleration forces having an amplitude at any instant equal and opposite to the amplitude of the acceleration and deceleration forces produced by said reciprocatory movement of said main driven means, whereby the acceleration and deceleration torques of said driven compensating means compensate, respectively, the acceleration and deceleration torques of said main driven means during the reciprocatory movement of the latter means.

5. A motion transmitting arrangement, comprising in combination, main driven means having a mass adapted to reciprocate along a predetermined path; rotatable driving means; first coupling means connected at one end to said rotatable driving means for rotation therewith at said one end connected at its other end to said main driven means so as to impart a reciprocatory movement to said main driven means during rotation of said rotatable driving means; driven compensating means having a mass turnable about an axis of turning in a predetermined arcuate path; and second coupling means connecting said driven compensating means to said rotatable driving means and attached at one end to said rotatable driving means in such manner as to impart a turning movement to said driven compensating means which is out of phase with said reciprocatory movement of said main driven means, whereby the acceleration and deceleration torques of said driven compensating means compensate, respectively, the acceleration and deceleration torques of said main driven means during the reciprocatory movement of the latter means.

6. A motion transmitting arrangement, comprising in combination, main driven means having a mass adapted to reciprocate along a predetermined horizontal path; rotatable driving means rotatable about a horizontal axis; first coupling means connected at one end to said rotatable driving means for rotation therewith at said one end connected at its other end to said main driven means so as to impart a horizontal reciprocatory movement to said main driven means during rotation of said rotatable driving means; driven compensating means having a mass turnable about an axis of turning in a predetermined arcuate path; and second coupling means connecting said driven compensating means to said rotatable driving means and attached at one end to said rotatable driving means in such manner as to impart a turning movement to said driven compensating means which is out of phase with said reciprocatory movement of said main driven means, whereby the acceleration and deceleration torques of said driven compensating means compensate, respectively, the acceleration and deceleration torques of said main driven means during the reciprocatory movement of the latter means.

7. A motion transmitting arrangement comprising, in combination, a roll housing means having a mass; supporting means supporting said roll housing means to reciprocate along a horizontal path and counteracting the force of gravity acting on said mass; rotatable driving means; first coupling means connected at one end to said rotatable driving means for rotation therewith at said one end and connected at its other end to said roll housing means so as to impart a reciprocatory horizontal movement to the same during rotation of said driving means; driven compensating means having a mass; supporting means supporting said compensating means to oscillate along a predetermined path and counteracting the force of gravity acting on said mass of said compensating means; and second coupling means connecting said driven compensating means to said rotatable driving means and attached at one end to said rotatable driving means in such manner as to impart an oscillatory movement to said driven compensating means having a cycle which is out of phase with said reciprocatory movement of said roll housing means whereby on said driving means the torques required for acceleration and deceleration of said roll housing means are compensated, respectively by the torques required for the deceleration and acceleration of said driven compensating means during reciprocatory movement of said roll housing means.

8. A motion transmitting arrangement comprising, in combination, a roll housing means having a mass; supporting means supporting said roll housing means to reciprocate along a horizontal path and counteracting the force of gravity acting on said mass; crank shaft means; first coupling connecting rod means connected at one end to said crank shaft means for turning movement therewith at said one end and connected at its other end to said roll housing means so as to impart a reciprocatory horizontal movement to the same during rotation of said driving crank shaft means; driven compensating means having a mass; supporting means supporting said compensating means to oscillate along a predetermined horizontal path and counteracting the force of gravity acting on said mass of said compensating means; and second coupling connecting rod means connecting said driven compensating means to said crank shaft means and attached at one end to said crank shaft means in such manner as to impart an oscillatory movement to said driven compensating means having a cycle which is out of phase with said reciprocatory movement of said roll housing means whereby on said crank shaft means the torques required for acceleration and deceleration of said roll housing means are compensated, respectively by the torques required for the deceleration and acceleration of said driven compensating means during reciprocatory movement of said roll housing means.

9. A motion transmitting arrangement as set forth in claim 8 wherein said crank shaft means has at least one first crank portion connected to said first coupling connecting rod means, and at least one second crank portion angularly displaced an angle of 90° with respect to said first crank portion and connected to said second coupling connecting rod means, said first and second crank portions being axially spaced from each other so that said first and second coupling connecting rod means are axially spaced from each other.

10. A motion transmitting arrangement comprising, in combination, a roll housing means having a mass; supporting means supporting said roll housing means to reciprocate along a horizontal path and counteracting the force of gravity acting on said mass; rotatable driving crank shaft means; first coupling connecting rod means connected at one end to said rotatable driving crank shaft means for rotation therewith at said one end and connected at its other end to said roll housing means so as to impart a reciprocatory horizontal movement to the same during rotation of said driving crank shaft means; driven compensating means having a mass; horizontal supporting shaft means supporting said compensating means for angular oscillation about the horizontal axis thereof and counteracting the force of gravity acting on said compensating means; and second coupling connecting rod means connecting said driven compensating means to said rotatable driving crank shaft means and attached at one end to said rotatable driving crank shaft means in such manner as to impart an oscillatory movement to said driven compensating means having a cycle which is out of phase with said reciprocatory movement of said roll housing means whereby on said crank shaft means the torques required for acceleration and deceleration of said roll housing means are compensated, respectively by the torques required for the deceleration and acceleration of said driven compensating means during reciprocatory movement of said roll housing means.

11. A motion transmitting arrangement as set forth in claim 10 wherein said crank shaft means has at least one first crank portion connected to said first coupling connecting rod means, and at least one second crank portion angularly displaced an angle of 90° with respect to said first crank portion and connected to said second coupling connecting rod means, said first and second crank portions being axially spaced from each other so that said first and second coupling connecting rod means are axially spaced from each other.

12. A motion transmitting arrangement comprising, in combination, a roll housing means having a mass; supporting means supporting said roll housing means to reciprocate along a horizontal path and counteracting the force of gravity acting on said mass; rotatable driving crank shaft means; first coupling connecting rod means connected at one end to said rotatable driving crank shaft means for rotation therewith at said one end and connected at its other end to said roll housing means so as to impart a reciprocatory horizontal movement to the same during rotation of said driving crank shaft means; driven compensating means having a mass; supporting means supporting said compensating means to oscillate along a predetermined horizontal path and counteracting the force of gravity acting on said mass of said compensating means; and second coupling connecting rod means connecting said driven compensating means to said rotatable driving crank shaft means and attached at one end to said rotatable driving crank shaft means in such manner as to impart an oscillatory movement to said driven compensating means having a cycle which is out of phase with said reciprocatory movement of said roll housing means whereby on said crank shaft means the torques required for acceleration and deceleration of said roll housing means are compensated, respectively by the torques required for the deceleration and acceleration of said driven compensating means during reciprocatory movement of said roller housing means, said first coupling connecting rod means and said roll housing means being located on one side of said crank shaft means, and said second coupling connecting rod means and said compensating means being located on the other side of said crank shaft means.

References Cited in the file of this patent

UNITED STATES PATENTS

| | | |
|---|---|---|
| 242,163 | Skinner | May 31, 1881 |
| 281,858 | Ford | July 24, 1883 |
| 348,107 | Cassaday | Aug. 24, 1886 |
| 741,301 | Briede | Oct. 13, 1903 |
| 1,126,750 | Goldberg | Feb. 2, 1915 |
| 2,179,649 | Trout et al. | Nov. 14, 1939 |
| 2,208,596 | Parks | July 23, 1940 |
| 2,222,299 | Parks | Nov. 19, 1940 |
| 2,249,802 | Wilson | July 22, 1941 |
| 2,265,379 | Lyne | Dec. 9, 1941 |

FOREIGN PATENTS

| | | |
|---|---|---|
| 596,965 | Great Britain | Jan. 14, 1948 |